United States Patent [19]

Lasoen

[11] Patent Number: 5,277,290
[45] Date of Patent: Jan. 11, 1994

[54] CONTROLLING POWERSHIFT TRANSMISSIONS

[75] Inventor: Jean J. Lasoen, Villepreux, France

[73] Assignee: Massey Ferguson, S.A., France

[21] Appl. No.: 966,086

[22] Filed: Oct. 23, 1992

[30] Foreign Application Priority Data

Nov. 9, 1991 [GB] United Kingdom ............... 9123881

[51] Int. Cl.$^5$ .................. B60K 41/28; B60K 41/22; F16H 61/02
[52] U.S. Cl. .................. 192/0.092; 192/3.62; 192/3.63; 74/335; 74/336 R
[58] Field of Search ............ 192/3.51, 3.52, 3.61, 192/3.62, 3.63, 0.092; 74/335, 336

[56] References Cited

U.S. PATENT DOCUMENTS

| | | |
|---|---|---|
| 4,186,627 | 2/1980 | Kuramochi . |
| 4,598,371 | 7/1986 | Klatt . |
| 4,640,146 | 2/1987 | Buback . |
| 4,648,290 | 3/1987 | Dunkley et al. ............ 192/0.092 X |
| 4,662,249 | 5/1987 | Miki et al. . |
| 4,722,248 | 2/1988 | Braun ......................... 74/336 R X |
| 4,855,913 | 8/1989 | Brekkestran et al. . |
| 4,913,269 | 4/1990 | Dunkley et al. .............. 192/3.63 |
| 5,022,509 | 6/1991 | Schweiger ................. 192/0.092 X |
| 5,053,961 | 10/1991 | Genise . |
| 5,054,591 | 10/1991 | Braun ............................ 192/3.63 |

FOREIGN PATENT DOCUMENTS 0240901 10/1987 European Pat. Off. .
3610494 10/1987 Fed. Rep. of Germany .
2119460 11/1983 United Kingdom .

Primary Examiner—Richard M. Lorence
Attorney, Agent, or Firm—MacMillan, Sobanski & Todd

[57] ABSTRACT

A system for controlling the selection of the operative ratio of a vehicle powershift transmission driven from an engine via a main clutch. The system includes a clutch status sensor for sensing engaged and disengaged conditions of the main clutch. A selector is provided for selecting the operative ratio of the transmission. Also, a control circuit is provided which includes a ratio-change modulating function which, when the main clutch is engaged and a change to a non-adjacent ratio is selected, invokes a serial routine which ensures that each intermediate ratio between the current ratio and the selected ratio is engaged for a moment to ensure a smooth substantially jerk-free progression between the current ratio and the selected ratio. When the main clutch is disengaged and a change to a non-adjacent ratio is selected, the control circuit invokes a direct routine which permits changes from a current ratio to a non-adjacent selected ratio without engagement of any intermediate ratio.

6 Claims, 2 Drawing Sheets

CONTROLLING POWERSHIFT TRANSMISSIONS

BACKGROUND OF THE INVENTION

This invention relates to the control of powershift transmissions for vehicles such as agricultural or industrial tractors.

SUMMARY OF THE INVENTION

One object of the present invention is to provide a system for the control of the operative ratio of a multi-ratio vehicle powershift transmission which facilitates use of the vehicle by the operator.

According to the present invention, there is provided a system for controllin the selection of the operative ratio of a vehicle powershift transmission driven from an engine via a main clutch, the system comprising:

a clutch status sensor for sensing engaged and disengaged conditions of the main clutch, selector means for selecting the operative ratio of the transmission, and control means including a ratio-change modulating function which, when the main clutch is engaged and a change to a non-adjacent ratio is selected, invokes a serial routine which ensures that each intermediate ratio between the current ratio and the selected ratio is engaged for a moment to ensure a smooth substantially jerk-free progression between the current ratio and the selected ratio, and when the main clutch is disengaged and a change to a non-adjacent ratio is selected invokes a direct routine which permits changes from a current ratio to a non-adjacent selected ratio without engagement of any intermediate ratio.

A control system in accordance with the present invention greatly facilitates and speeds up the operation of the associated vehicle when it is desired to make changes to non-adjacent ratios in the powershift as, for example, when turning with a tractor on a field headland or when accelerating with a tractor pulling a heavy trailer on the road. In this latter situation, it may be necessary to change through the entire powershift ratio band and then shift simultaneously from the highest powershift ratio to the lowest powershift ratio while also changing to the next highest gear ratio in an associated main gearbox in order to select the next highest gear ratio in the transmission as a whole.

The system may simply include a manually operable selector means, such as a column or floor mounted selector lever, with which the vehicle operator selects the desired operative ratio of the powershift.

Alternatively, the system may be automated with the operative ratio being selected automatically by the selector means which compares desired and actual values of one or more vehicle operating parameters and determines which ratio is the more efficient to select, consistent with the actual value of the sensed operating parameter(s) in order to try to achieve the desired value of the operating parameter(s).

BRIEF DESCRIPTION OF THE DRAWINGS

One embodiment of the present invention will now be described, by way of example only, with reference to the accompanying drawings in which.

DESCRIPTION OF THE PREFERRED EMBODIMENT

Figure 1:
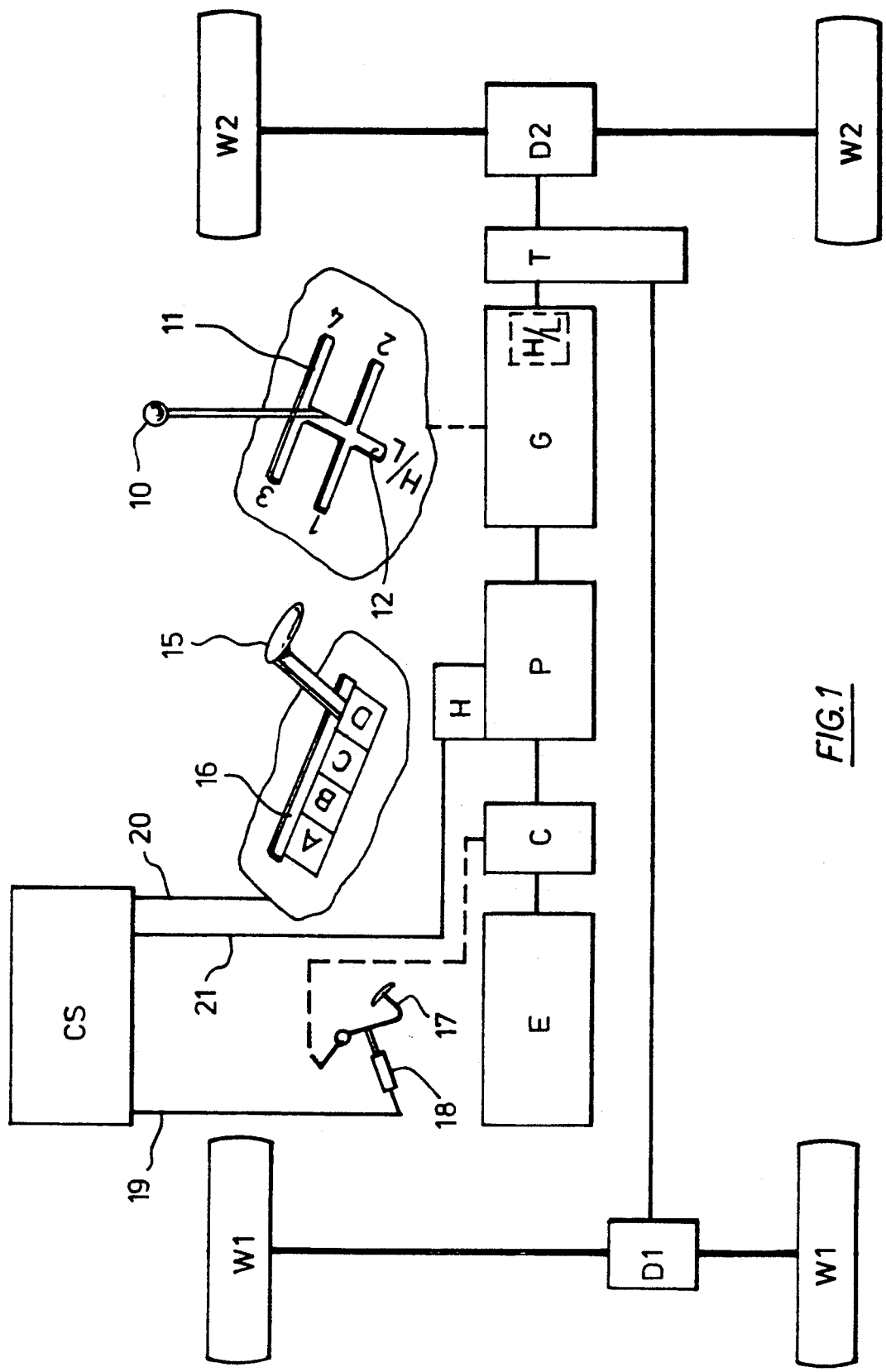
FIG. 1 is a diagrammatic representation of a ratio selection system for use in an agricultural tractor.

Referring to FIG. 1, this shows a tractor transmission in which an engine E drives front and rear wheels W1 and W2 via differentials D1 and D2, a main clutch C, a powershift unit P, a main gearbox G and a transfer box T. The main gearbox G will typically have four ratios and is controlled by a selector lever 10 moving in a generally H-shaped gate shown diagrammatically at 11. Main gearbox G also includes a high/low range facility indicated by the dotted detail H/L within the main gearbox G. This high/low range facility is actuated by movement of the selector lever 10 to the H/L position indicated at 12 on the gate 11. Each movement of the lever 10 to the position 12 operates a solenoid controlled fluid flow control valve (not shown) which in turn operates an hydraulic ram to successively switch the H/L facility between high and low ranges.

In the example illustrated, the powershift transmission P is of a four ratio planetary type as described in the applicant's co-pending UK Patent Applications Nos. 9116856.7 and 9116851.8 and provides four operating ranges A, B, C and D. The powershift transmission is controlled by a selector lever 15 which is movable between positions A, B, C and D in an associated range change selector gate 16. The actual engagement of the selected range A, B, C or D is effected by an hydraulic control system indicated diagrammatically at H in FIG. 1.

Further details of a suitable hydraulic control system can be found in the applicant's previously referred to co-pending application 9116851.8. Since the details of the hydraulic control system form no part of the present invention and are not necessary for a full understanding of the present invention, no further details will be given in the present application. The reader is directed to co-pending application 9116851.8 if further details of the hydraulic control system are required.

The main clutch C is operated by a clutch pedal 17. A sensor 18 is provided to indicate whether the clutch pedal is in the clutch engaged or clutch released position. This sensor may take any suitable form.

An electronic microprocessor-based control system CS receives the signal from sensor 18 via line 19, together with a signal indicating the selected range A, B, C, or D via a line 20 and issues control signals to hydraulic control system H via a line or lines 21.

Figure 2:
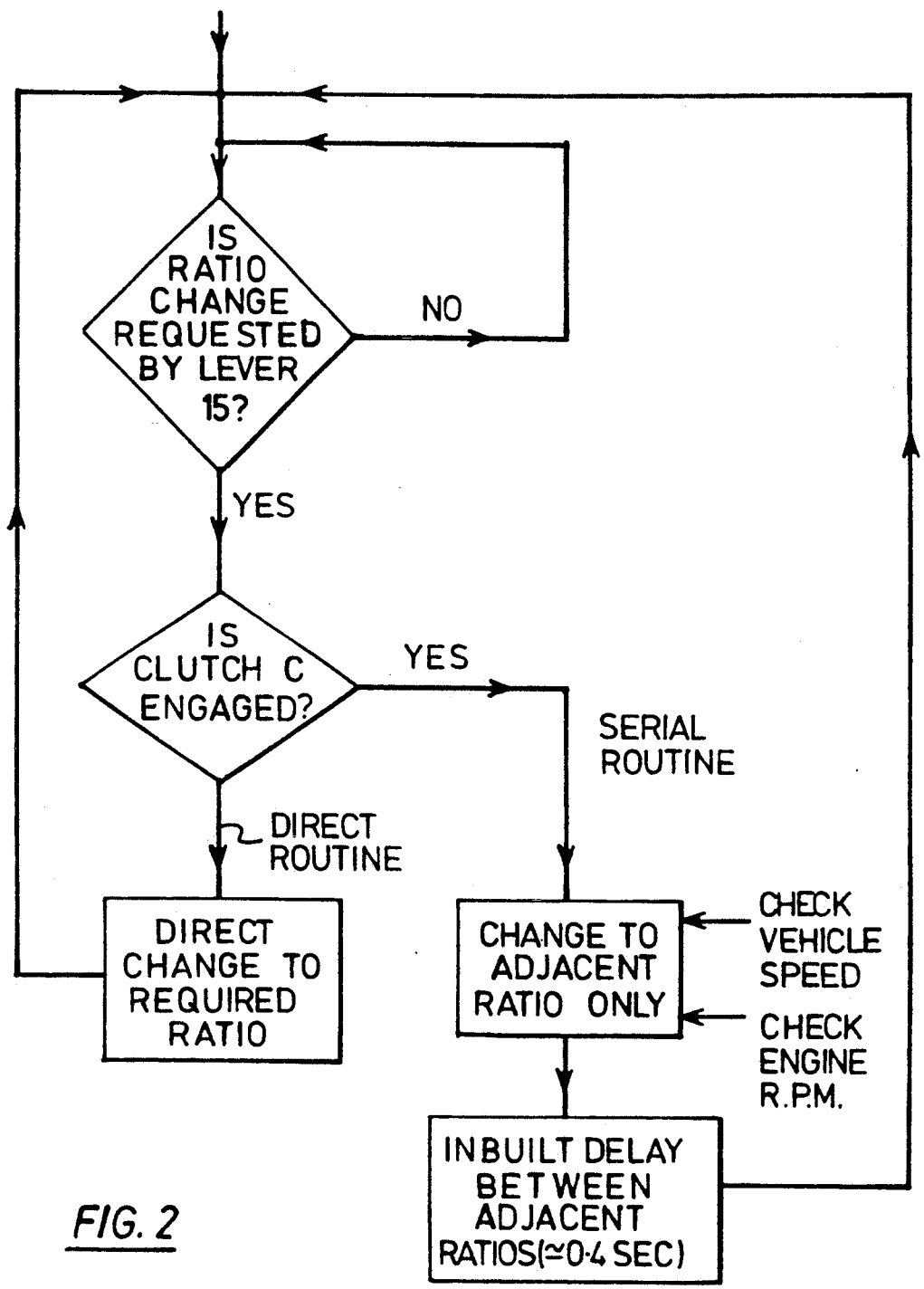
FIG. 2 is a flow diagram of the logic used in the system of FIG. 1.

The control system CS, which may perform other control and monitoring functions (not described) in addition to the present ratio control function, operates in its ratio control function basically in accordance with the simple logic diagram of FIG. 2.

Thus, whenever the clutch pedal 17 is in the clutch engaged condition, the powershift transmission cannot change to a non-adjacent range without each range between the current range and the selected range being engaged at least for a moment.

For example, if the tractor operator were to select a change from current range D to range A by movement of lever 15 from the D to A position, the control system CS ensures, by the issuance of the appropriate signals to hydraulic control system H, that ranges C and B are each engaged for a moment so that the tractor will change progressively from range D to range C to range B to range A. This ensures an orderly and smooth change in the operating range of the transmission and is the "serial" range-changing routine described in detail in the applicant's previously referred to co-pending application 9116851.8. This "serial" routine includes an inherent delay in changing between each adjacent range due to the predetermined sequence of events necessary to change the condition of the appropriate range engagement clutches of the powershift P and may also include a vehicle speed and engine RPM check between each range change to ensure a smooth transition between each range. Should the vehicle speed (detected by, for example, a radar device) be found inappropriate for the range and gearbox ratio selected, the range change may be barred and/or the tractor operator warned that the desired change has not been made. Similarly, if the engine RPM is found to be inappropriate this would be adjusted automatically before the engagement of the selected range is allowed.

However, should the clutch pedal 17 be depressed to disengage drive between the engine E and the powershift P, this clutch disengaged condition is communicated to the control system CS by sensor 18 and an alternative "direct" range-changing routine is invoked.

When operating under this "direct" routine, it is possible for the tractor operator to select a change from range D to range A by movement of the lever 15 from the D to A position without necessitating the engagement of the intermediate ratios C and B.

The "serial" and "direct" routines are clearly indicated in the logic diagram of FIG. 2.

As indicated above, the ability to change directly to non-adjacent ratios greatly facilities and speeds up the operation of the vehicle in certain conditions. For example, when the tractor is turning on a field headland or when the tractor is accelerating while pulling a heavy trailer on the road. In this latter situation the arrangement of the ratios in the powershift transmission P and the main gearbox G may well necessitate a change to the entire powershift range band, i.e. from range A to range D, and then to shift simultaneously from the highest powershift range D to the lowest powershift range A while also changing to the next highest ratio in the main gearbox G in order to select the next highest ratio in the transmission as a whole.

Clearly a control system in accordance with the present invention will greatly facilitate such use since disengagement of the main clutch C will allow the operator to change between the powershift ratios A and D with very little time delay since there is no necessity to engage the intermediate ratios B and C.

Whilst the present invention has been described above in relation to a tractor provided with a transmission in which the powershift ratios and main gearbox ratios are selected by manual operation of associated selector levers, the invention is also applicable to a transmission in which the powershift and/or main gearbox ratios are selected automatically by selector means which compares desired and actual values of one or more tractor operating parameters and then determines in accordance with predetermined operating criteria the transmission ratio to be selected consistent with the actual value of the sensed operating parameters in order to try to achieve the desired value of the operating parameters.

I claim:

1. A system for controlling the selection of the operative ratio of a vehicle powershift transmission driven from an engine via a main clutch, the system comprising:

a clutch status sensor for sensing engaged and disengaged conditions of the main clutch and for generating a clutch status signal in response thereto, selector means for selecting the operative ratio of the transmission and for generating a selected ratio signal in response thereto, and control means responsive to said clutch status signal and said selected ratio signal for controlling the selection of the operative ratio of the vehicle powershift transmission such that:

when the main clutch is engaged and a change to a non-adjacent ratio is selected, said control means invokes a serial routine which ensures that each intermediate ratio between the current ratio and the selected ratio is engaged for at least a moment to ensure a smooth substantially jerk-free progression between the current ratio and the selected ratio, and when the main clutch is disengaged and a change to a non-adjacent ratio is selected, said control means invokes a direct routine which permits changes from a current ratio to a non-adjacent selected ratio without engagement of any intermediate ratio.

2. A system according to claim 1 wherein said selector means includes a manually operable lever for manually generating said selected ratio signal.

3. A system according to claim 1 wherein said selector means includes a control system for automatically generating said selected ratio signal.

4. A system according to claim 1 further including means for generating a signal which is representative of an operating condition of the vehicle, and wherein said control means is also responsive to said operating condition signal for controlling the selection of the operative ratio of the vehicle powershift transmission.

5. A system according to claim 4 wherein said operating condition of the vehicle is vehicle speed.

6. A system according to claim 4 wherein said operating condition of the vehicle is engine speed.

* * * * *